(12) United States Patent
Pos et al.

(10) Patent No.: US 11,851,206 B2
(45) Date of Patent: Dec. 26, 2023

(54) AIRCRAFT LANDING SYSTEMS AND METHODS

(71) Applicant: Honeywell International Inc., Charlotte, NC (US)

(72) Inventors: Marc Pos, Duvall, WA (US); Lawrence Surace, Phoenix, AZ (US)

(73) Assignee: Honeywell International Inc., Charlotte, NC (US)

(*) Notice: Subject to any disclaimer, the term of this patent is extended or adjusted under 35 U.S.C. 154(b) by 63 days.

(21) Appl. No.: 17/644,963

(22) Filed: Dec. 17, 2021

(65) Prior Publication Data
US 2023/0192313 A1 Jun. 22, 2023

(51) Int. Cl.
| | |
|---|---|
| *B64D 15/04* | (2006.01) |
| *G01S 13/93* | (2020.01) |
| *B64F 1/18* | (2006.01) |
| *B64D 45/04* | (2006.01) |
| *G01S 13/933* | (2020.01) |

(52) U.S. Cl.
CPC ............ *B64D 45/04* (2013.01); *B64F 1/18* (2013.01); *G01S 13/933* (2020.01)

(58) Field of Classification Search
CPC .......... B64D 45/04; B64F 1/18; G01S 13/933
See application file for complete search history.

(56) References Cited

U.S. PATENT DOCUMENTS

| | | | |
|---|---|---|---|
| 3,875,551 A | 4/1975 | Young | |
| 5,179,382 A * | 1/1993 | Decker | .................. H01Q 15/18 |
| | | | 342/8 |
| 5,208,601 A | 5/1993 | Hart | |
| 8,576,113 B1 | 11/2013 | Seah et al. | |
| 9,933,521 B2 | 4/2018 | Riley et al. | |
| 10,126,411 B2 | 11/2018 | Gilliland et al. | |
| 10,249,200 B1 * | 4/2019 | Grenier | ................. G05D 1/0094 |
| 10,254,767 B1 * | 4/2019 | Kamon | .................. G06V 20/13 |
| 10,395,544 B1 * | 8/2019 | Harris | .................. G08G 5/0069 |
| 10,615,507 B1 * | 4/2020 | Wilcox | ................ G05D 1/0676 |

(Continued)

FOREIGN PATENT DOCUMENTS

DE 102014211522 A1 12/2015

OTHER PUBLICATIONS

Doer Christopher et al: "Radar Based Autonomous Precision Take-off and Landing System for VTOLs in GNSS Denied Environments", 2020 International Conferene on Unmanned Aircraft Systems (ICUAS), IEEE, Sep. 1, 2020 (Sep. 1, 2020), pp. 922-931, XP033836644, DOI: 10.1109/ICUAS48674.2020,9213925 [retrieved on Oct. 5, 2020].

*Primary Examiner* — Tyler J Lee
(74) *Attorney, Agent, or Firm* — Alston & Bird LLP

(57) ABSTRACT

A computer-implemented method of navigating a vertical take-off and landing ("VTOL") vehicle near a landing zone, may comprise receiving data related to a first radar signal reflected from at least one corner reflector; determining whether the received data is consistent with a predefined target landing zone; upon determining that the received data is consistent with the predefined target landing zone, determining a location of the VTOL vehicle relative to the predefined target landing zone, using a second radar signal reflected from at least one corner reflector; and determining whether the location of the VTOL vehicle is consistent with a predefined landing position.

20 Claims, 7 Drawing Sheets

(56) References Cited

U.S. PATENT DOCUMENTS

| | | | |
|---|---|---|---|
| 10,815,005 B1 | 10/2020 | Wilcox et al. | |
| 2015/0355318 A1* | 12/2015 | Durand | G01S 13/02 |
| | | | 342/5 |
| 2016/0068264 A1* | 3/2016 | Ganesh | G06Q 30/0641 |
| | | | 701/4 |
| 2017/0313439 A1* | 11/2017 | Holt | B64D 47/08 |
| 2018/0357910 A1* | 12/2018 | Hobbs | B64C 27/00 |
| 2020/0310467 A1 | 10/2020 | Birkedahl et al. | |

* cited by examiner

AIRCRAFT LANDING SYSTEMS AND METHODS

TECHNICAL FIELD

Various embodiments of the present disclosure relate generally to the field of aircraft landing systems and methods and, more particularly, to methods and systems for reflector-based landing systems and methods for vertical take-off and landing ("VTOL") vehicles.

BACKGROUND

In order to land, VTOL vehicles need to align with a pre-determined landing zone (e.g., a landing pad). A pilot of a VTOL vehicle can, presently, align to a visual cue on the landing zone (e.g., a cross or a symbol), in order to manually control the VTOL and align the VTOL with the landing zone. Unmanned aerial systems ("UAS"), however, sometimes lack a pilot to perform such visual alignment to align with the landing zone. A visually degraded environment (e.g., due to weather or a lack of lighting) can also inhibit a pilot's ability to utilize visual cues to identify and/or align with the landing zone. As urban air mobility ("UAM") grows, importance of VTOL vehicles likely will increase, further compounding difficulties with reliance on visual cues for landing. The present disclosure is directed to overcoming one or more of these above-referenced challenges.

SUMMARY OF THE DISCLOSURE

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

In one example, a computer-implemented method of navigating a vertical take-off and landing ("VTOL") vehicle near a landing zone may comprise receiving data related to a first radar signal reflected from at least one corner reflector; determining whether the received data is consistent with a predefined target landing zone; upon determining that the received data is consistent with the predefined target landing zone, determining a location of the VTOL vehicle relative to the predefined target landing zone, using a second radar signal reflected from at least one corner reflector; and determining whether the location of the VTOL vehicle is consistent with a predefined landing position.

Any of the systems or methods disclosed herein may have any of the following features. The first radar signal is reflected from at least three corner reflectors, wherein the corner reflectors are arranged in a triangular array. Upon determining that the location of the VTOL vehicle is consistent with the predefined landing position the VTOL may automatically be landed. Upon determining that the location of the VTOL vehicle is consistent with the predefined landing position, a visual or auditory indicator may be provided to an operator. Upon determining that the location of the VTOL vehicle is inconsistent with the predefined landing position, the VTOL may be automatically repositioned. Determining whether the received data is consistent with the predefined target landing zone may include comparing the received data to a library of landing zone profiles. Determining whether the received data is consistent with the predefined target landing zone may include determining at least one of a maximum reflection, radar cross-section, a size, or a color of the at least one corner reflector.

In another example, a computer-implemented method of navigating a VTOL vehicle near a landing zone may comprise receiving data related to a radar signal reflected from at least three corner reflectors on a predefined target landing zone; using the received data, determining whether the location of the VTOL vehicle is consistent with a predefined landing position; and upon determining that the location of the VTOL vehicle is consistent with the predefined landing position, automatically landing the VTOL vehicle or providing a visual or auditory indicator to an operator.

Any of the systems or methods disclosed herein may have any of the following features. The three corner reflectors may define a triangle. The determining step may also include analyzing a visual indicator. The determining step may also include comparing the received data to a predefined profile. The predefined profile may include at least one of a shape, size, or color of the at least three corner reflectors.

In another example, a system for vehicle landing may comprise: a first corner reflector; a second corner reflector; and a third corner reflector, wherein the first corner reflector, the second corner reflector, and the third corner reflector are arranged in a triangular shape on a landing zone for a VTOL vehicle, wherein the first corner reflector has a first radar cross section ("RCS"), wherein the second corner reflector has a second RCS, and wherein the first RCS differs from the second RCS.

Any of the systems or methods disclosed herein may have any of the following features. A center point of the landing zone may be within the triangular shape. Each of the first corner reflector, the second corner reflector, and the third corner reflector may have a trihedral shape. The third corner reflector may have a third RCS, and wherein the third RCS differs from the first RCS and the second RCS. The triangular shape may be at least one of an equilateral shape, an isosceles shape, or a scalene shape. The triangular shape may be a first triangular shape, and the landing zone may be a first landing zone, with the system further comprising: a fourth corner reflector; a fifth corner reflector; and a sixth corner reflector, wherein the fourth corner reflector, the fifth corner reflector, and the sixth corner reflector are arranged in a second triangular shape on a second landing zone. The first corner reflector and the second corner reflector may be separated by a first distance, the third corner reflector may be separated from a midpoint between the first corner reflector and the second corner reflector by a second distance, and the second distance may be greater than the first distance. The first corner reflector may include a 5 dBsm trihedral corner reflector, a 10 dBsm trihedral corner reflector, or a 15 dBsm trihedral corner reflector.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of navigation for urban air mobility vehicles and, more particularly, to methods and systems for radar sensor assisted vehicle navigation.

A system for facilitating landing of a vehicle, such as a VTOL vehicle, may include a plurality of reflectors, such as corner reflectors. A landing zone (e.g., landing pad) may include an array of one or more reflectors (e.g., at least three reflectors) arranged thereon. In one example, the landing zone includes three reflectors that are arranged in a triangular shape. The reflectors may have varying radar cross sections ("RCS"). A VTOL vehicle may emit a radar signal, which reflects off the reflectors. Because the reflectors have defined RCS properties, the profile of the reflections facilitate identifying and aligning with the landing zone. As a VTOL vehicle approaches a landing zone, a pattern of the reflectors (arrangement and RCS) may enable differentiation of a landing zone from other, nearby landing zones. As the VTOL vehicle nears the landing zone, the pattern may enable aligning the VTOL vehicle in a desired position (e.g., over the landing zone). An automated system may perform the analysis to identify the landing zone and identify alignment with the landing zone. Methods for setting up and using the disclosed systems may accommodate piloted vehicles and UAS. A pilot may use the system for supplementing visual cues and/or in situations having low visibility. Additionally or alternatively, automated methods may be used to analyze the data from the reflectors and automatically operate the vehicle to align the vehicle with the landing zone.

Figure 1:
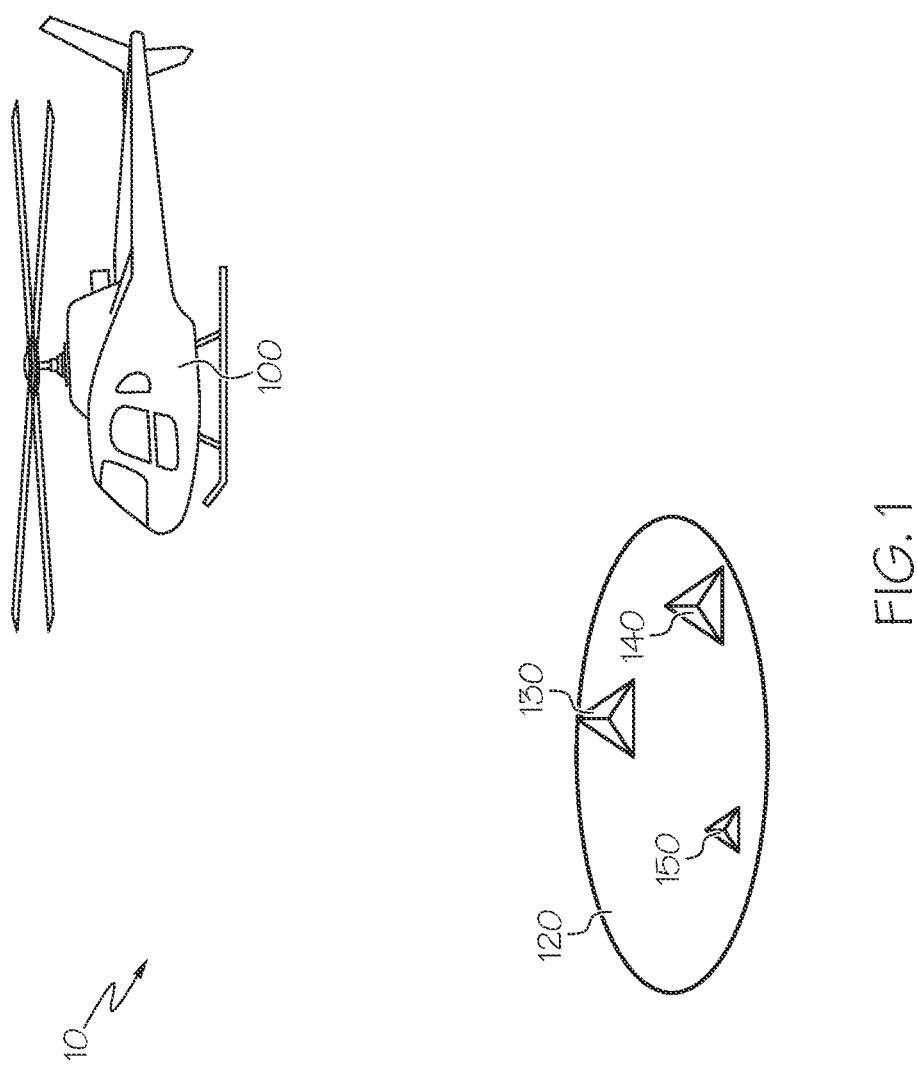
FIG. 1 depicts an exemplary system for facilitating landing a VTOL vehicle.

FIG. 1 depicts an exemplary system 10 for facilitating identification of and/or alignment with landing zones. System 10 may be of particular use for VTOL vehicles. In one example, system 10 includes a landing zone 120 (e.g., a landing pad such as a helipad). Landing zone 120 may include a plurality of reflectors, such as corner reflectors. As show in FIG. 1, in one example, landing zone 120 includes three corner reflectors 130, 140, 150. Corner reflectors 130, 140, 150 may be, for example, trihedral corner reflectors. Trihedral corner reflectors may be particularly advantageous because they reflect over a wide incidence angle. Alternatively, other shapes of corner reflectors (e.g., dihedral corner reflectors) may be utilized. Corner reflectors 130, 140, 150 may all be the same shape or may have differing shapes. As show in FIG. 1, corner reflectors 130, 140, 150 may each be trihedral corner reflectors. In the example of FIG. 1, corner reflectors 130, 140, 150 provide a very high RCS in a compact form-factor. Although corner reflectors are referred to herein, other types of reflectors, however, may also be utilized with the systems and methods described herein.

A vehicle 100 may be fitted with a radar system that emits a radar signal. The radar system may be any suitable radar system. As shown in FIG. 1, vehicle 100 may be an aircraft such as a VTOL vehicle. Examples of VTOL vehicles include helicopters, drones, tiltrotor aircraft, and aircraft using directed jet thrusts. A VTOL may be manned or unmanned (i.e., a UAS). The system described herein may be particularly useful with VTOL vehicles, as compared to fixed-wing vehicles, due to the shapes of the arrays and the reflection profiles of the reflectors.

Figure 2A:
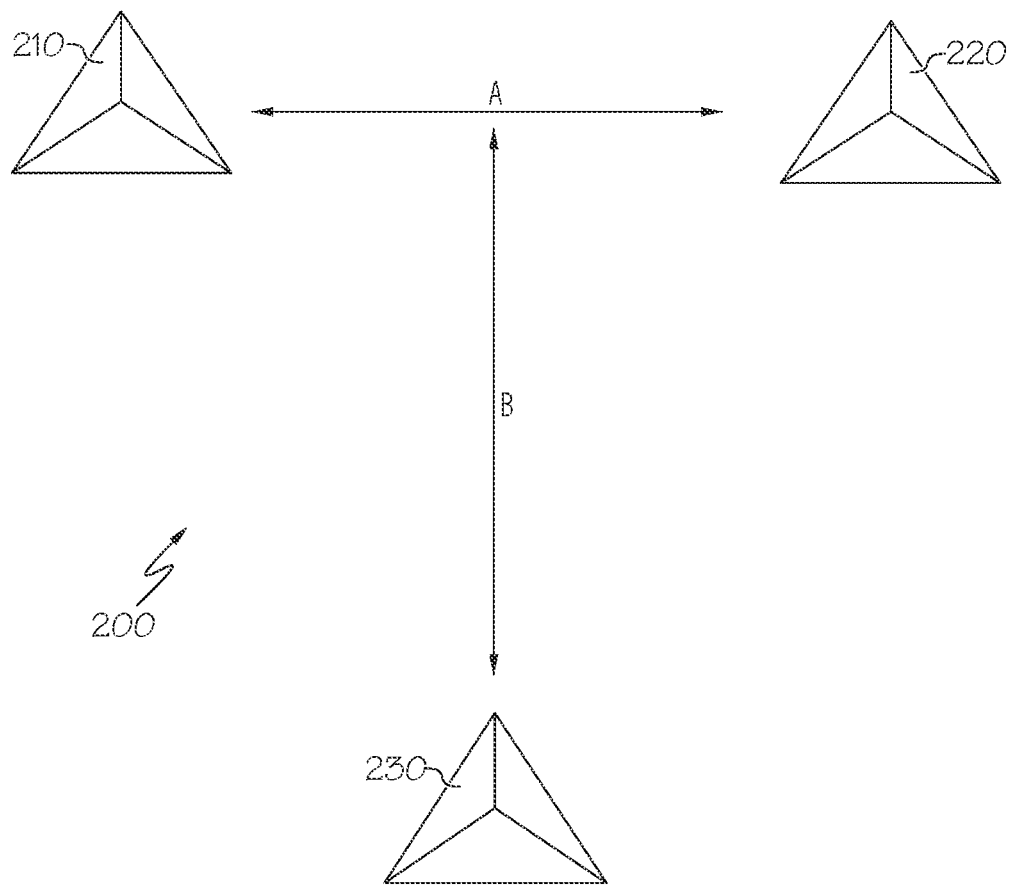
FIGS. 2A and 2B depict exemplary configurations of the system of FIG. 1.
Figure 2B:
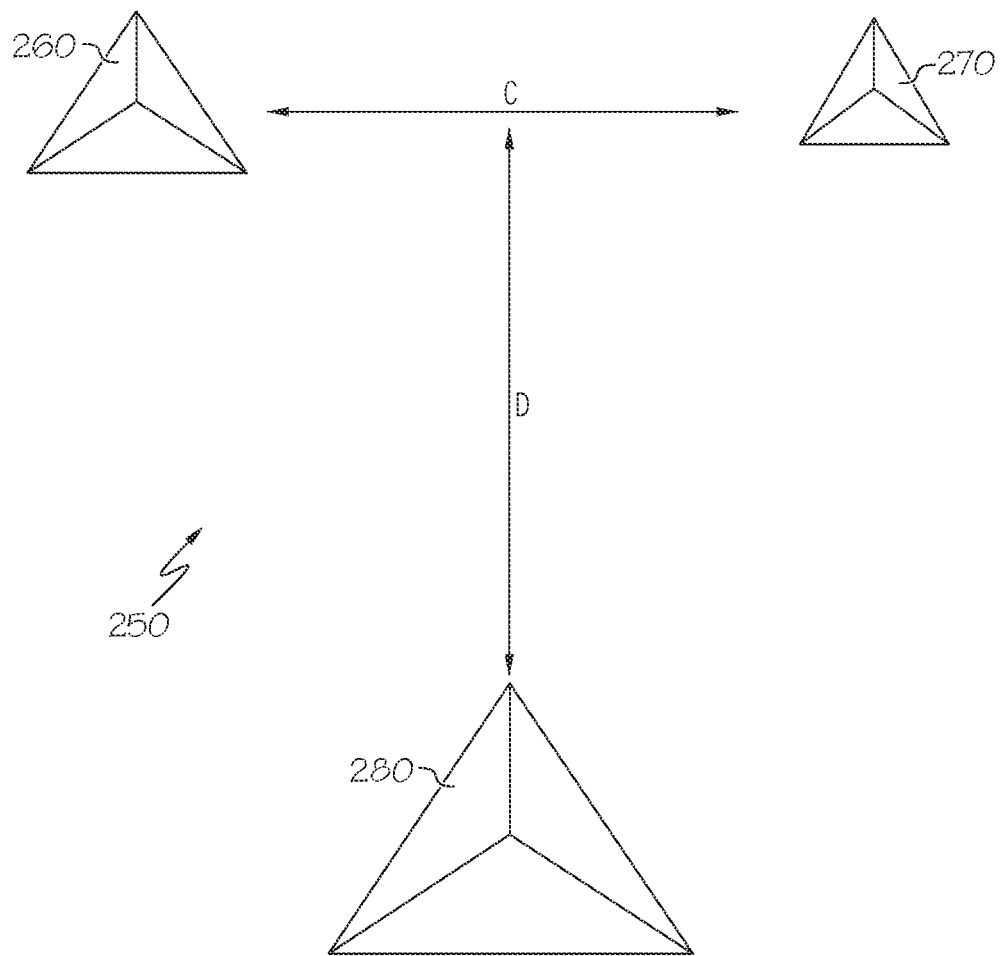

FIGS. 2A-2B show exemplary arrays 200 (FIG. 2A) and 250 (FIG. 2B) of corner reflectors for use with system 10. As shown in FIG. 2A, array 200 may include a plurality of corner reflectors 210, 220, 230. Three corner reflectors are depicted in array 200, but varying numbers of corner reflectors may be used. An array with at least 3 corner reflectors (such as arrays 200 and 250) may be particularly advantageous, because the array may form a triangular or other non-linear pattern that facilitates identification of an affiliated landing zone and positioning relative to the landing zone. Corner reflectors 210, 220, 230 may form vertices of a shape (e.g., of a triangle). Corner reflectors 210, 220, 230 may be arranged so that a vehicle lands at least partially within the shape (e.g., triangle) defined by the corner reflectors 210, 220, 230. For example, a center of the landing zone may be within a shape having the corner reflector 210, 220, 230 as vertices.

As shown in array 200, corner reflectors 210 and 220 may be separated by a distance A. Corner reflector 230 may be separated from an axis running through corner reflectors 210 and 220 by a distance B. In other words, distance B is a distance between corner reflector 230 and a midpoint between corner reflectors 210 and 220. Distances A and B may be different from one another. For example, distance B may be greater than distance A, such that a triangle formed by corner reflectors 210, 220, and 230 is an isosceles triangle. In one example, distance A may be approximately 5 m and distance B may be approximately 7 m. Having varying distances A and B between the reflectors may aid in differentiating array 200 from other arrays and may provide array 200 with a "signature." The arrangement above is merely exemplary. Other triangle shapes may be used for arrays with three corner reflectors 210, 220, 230, such as equilateral triangles, right triangles, and scalene triangles. The triangle shapes may have varying dimensions (e.g., side lengths and angles).

With reference to FIG. 2B, array 250 may include corner reflectors 260, 270, 280. Different sizes of corner reflectors have different RCS values. The RCS is proportional to a length of sides of the corner reflector. Corner reflectors 260, 270, 280 may have varying RCS values.

In the example of array 250, for example, corner reflector 260 has an RCS of 10 dBsm (decibels relative to a square meter), corner reflector 270 has an RCS of 5 dBsm, and corner reflector 280 has an RCS of 15 dBsm. The arrangement of corner reflectors 260, 270, 280 is merely exemplary. Corner reflectors of various RCS values may be used and may be arranged in different patterns. Multiple of corner reflector 260, 270, 280 may have the same RCS values.

Figure 3:
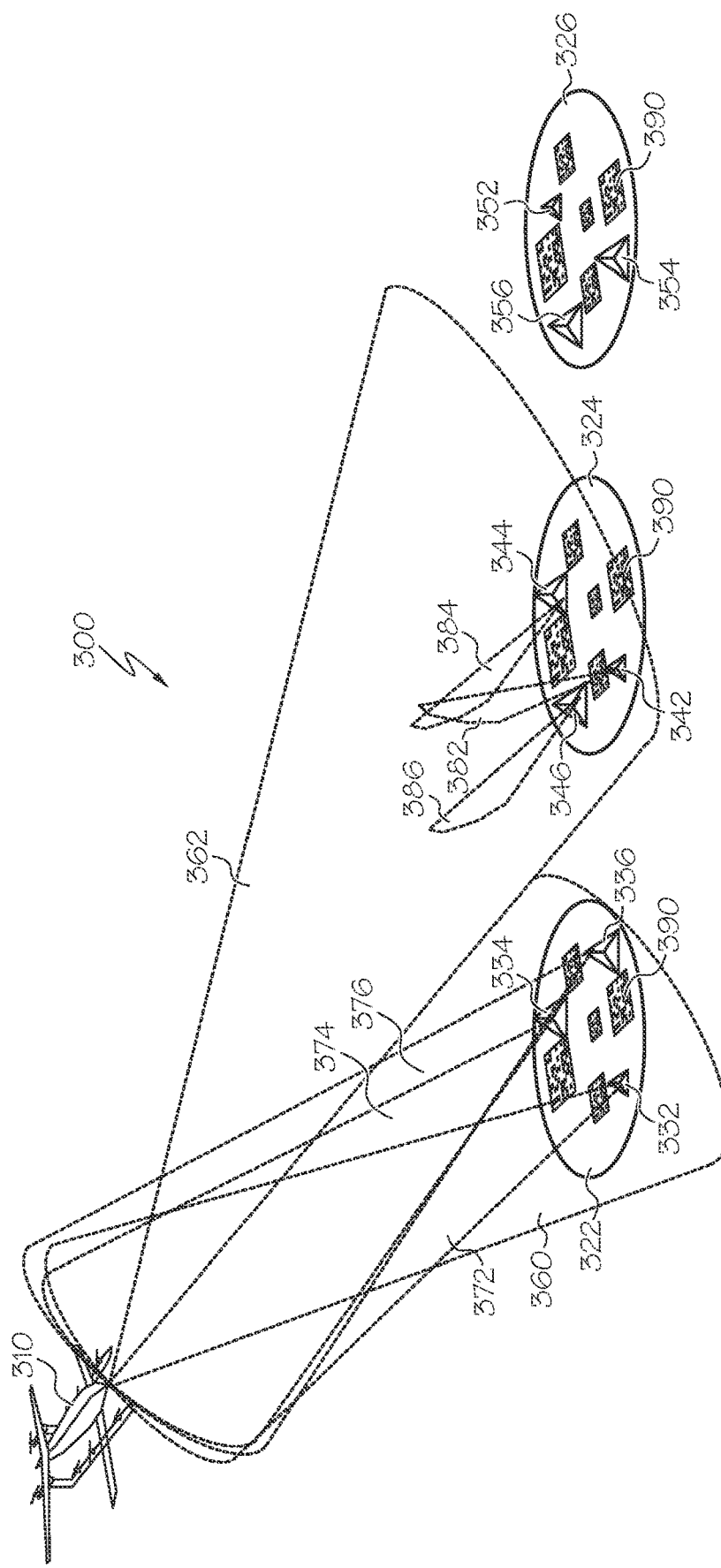
FIG. 3 depicts aspects of an exemplary system for facilitating VTOL landing.

FIG. 3 depicts an example system 300 having multiple landing zones 322, 324, and 326. Although FIG. 3 depicts three landing zones, any suitable number may be used. In the example of FIG. 3, each of landing zones 322, 324, 326 includes an array of corner reflectors. A vehicle 310 is depicted approaching landing zones 322, 324, 326. Vehicle 310 may have any of the properties of vehicle 100. As depicted in FIG. 3, vehicle 310 may be any aerial vehicle, such as a VTOL vehicle and/or UAS. The interaction between radar signals emitted by vehicle and the arrays on landing zones 322, 324, 326 facilitates identification of a desired landing zone and alignment with the desired landing zone.

Figure 4:
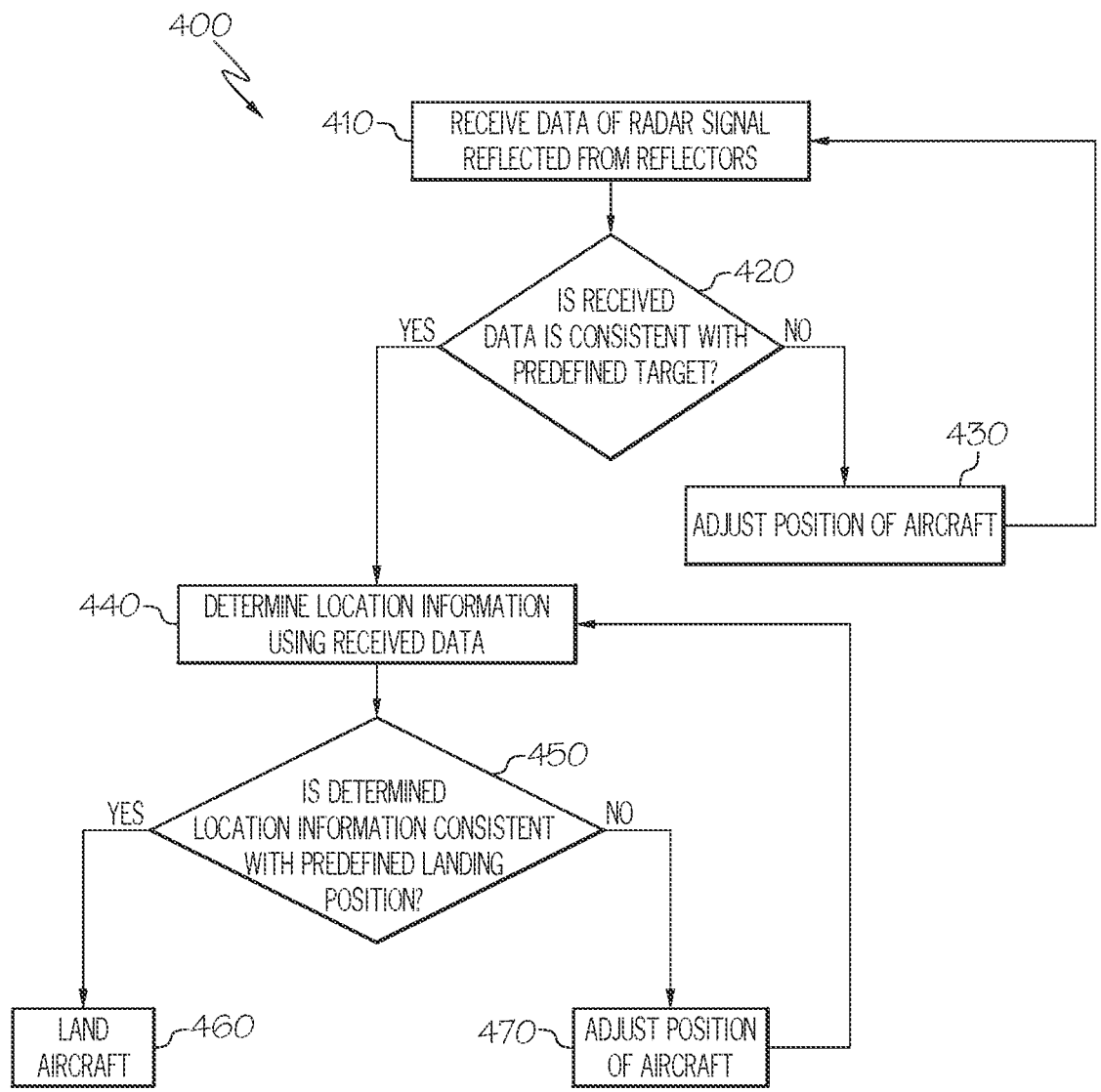
FIGS. 4 and 5 are flow charts depicting exemplary methods for using the systems disclosed herein.

A first landing zone 322 may include corner reflectors 332, 334, 336. Corner reflectors 332, 334, and 336 may have any of the properties, such as those described above, and may be arranged in any suitable arrangement, such as those described above. In the example system 300 of FIG. 3, first corner reflector 332 is a 5 dBsm trihedral corner reflector, second corner reflector 334 is a 10 dBsm trihedral corner reflector, and third corner reflector 336 is a 15 dBsm trihedral corner reflector. However, these values and shapes are merely exemplary. As shown in FIG. 4, corner reflectors 332, 334, 336 may be arranged so as to form the vertices of a triangular shape. The distance between the corner reflectors 332, 334, 336 (the "sides" of the triangle) may be varied to form any suitable shape.

A second landing zone 324 may include corner reflectors 342, 344, 346. Corner reflectors 342, 344, and 346 may have any of the properties, such as those described above, and may be arranged in any suitable arrangement, such as those described above. In the example system 300 of FIG. 3, first corner reflector 342 is a 5 dBsm trihedral corner reflector, second corner reflector 344 is a 10 dBsm trihedral corner reflector, and third corner reflector 346 is a 15 dBsm trihedral corner reflector. However, these values and shapes are merely exemplary. As shown in FIG. 4, corner reflectors 342, 344, 346 may be arranged so as to form the vertices of a triangular shape. The distance between the corner reflectors 342, 344, 346 (the "sides" of the triangle) may be varied to form any suitable shape.

A third landing zone 326 may include corner reflectors 352, 354, 356. Corner reflectors 352, 354, and 356 may have any of the properties, such as those described above, and may be arranged in any suitable arrangement, such as those described above. In the example system 300 of FIG. 3, first corner reflector 352 is a 5 dBsm trihedral corner reflector, second corner reflector 354 is a 10 dBsm trihedral corner reflector, and third corner reflector 356 is a 15 dBsm trihedral corner reflector. However, these values and shapes are merely exemplary. As shown in FIG. 4, corner reflectors 352, 354, 356 may be arranged so as to form the vertices of a triangular shape. The distance between the corner reflectors 352, 354, 356 (the "sides" of the triangle) may be varied to form any suitable shape.

Vehicle 310 may emit radar signals 360, 362, which may spread out as they get farther from vehicle 310, as shown in FIG. 3. For example, signals 360, 362 may have a cone shape that gets larger with increasing distance from vehicle 310. As signals 360, 362 encounter a landing zone having a corner reflector array, corner reflectors of the array may reflect back the radar signal. As referenced above, corner reflectors with different RCS values reflect back different amounts of the radar signal. Similarly, different arrangements of corner reflectors will create different reflection profiles. Depending on an angle and a distance of vehicle 310 relative to a landing zone having a corner reflector array, an emitted radar signal 360,360 may or may not be reflected back to vehicle 310. In the example of FIG. 3, radar signal 360 reflects off of corner reflectors 332, 334, 336 of first landing zone 322 in reflections 372, 374, 376, respectively. On the other hand, reflectors 342, 344, 346 may reflect much smaller reflections 332, 384, 386, respectively. In the example of FIG. 3, reflections 372, 374, 376 from first landing zone 322 reach a detector of vehicle 310. On the other hand, reflections 382, 384, 386 are smaller and may not reach the detector of vehicle 310. As shown in FIG. 3, radar signals 360, 262 may also not reach landing zone 326, and therefore reflections may not be generated by corner reflectors 352, 354, 356. If reflections 382, 384, 384 (and/or reflections from corner reflectors 352, 354, 356) do reach the detector of vehicle 310, then, as discussed below, a controller may compare a profile (including, e.g., RCS signature and a physical configuration of reflectors 332, 334, 336) of landing zone 322 to the received reflections in order to determine an alignment of vehicle 310.

A vehicle-based system of vehicle 310, or an off-board system (e.g., ground- or cloud-based system) may be equipped to interpret signal(s) reflected from a landing zone (such as first landing zone 322). Assuming that vehicle 310 intends to land on first landing zone 322, the reflections depicted in FIG. 3 (and described above) may be interpreted to indicate vehicle 310 is targeted to the correct landing zone. For example, the received reflections may reflect a known profile (e.g., a "signature") of first landing zone 322. If, on the other hand, vehicle 310 does not intend to land on first landing zone 322 (e.g., vehicle 310 intends to land on second landing zone 324 or third landing zone 324), then the reflected signals of FIG. 3 may be interpreted by the on-board or off-board system to indicate that vehicle 310 is not targeted to the desired landing zone. As described in further detail below, vehicle 310 may then be automatically or manually re-directed so that vehicle 310 may approach and land at the desired landing zone.

System 300 may also include optical-based features such as QR codes 390 on landing zones 322, 324, 326. QR codes 390 (or other optical aligning features) may assist with aligning vehicle 310 once vehicle 310 is in an appropriate position to have an optical system engage with QR codes 390. QR codes 390 and the corner reflectors described above may be used simultaneously to align vehicle 310 or may be used at different phases of landing. For example, the radar reflections from the corner reflectors may provide guidance at further distances, while QR codes 390 may guide landing at closer distances. Additionally or alternatively, QR codes 390 may be used in visual conditions permitting such an optically-based system, while the radar reflections from the corner reflectors may be utilized in poor visual conditions or in all visual conditions.

FIG. 4 depicts an exemplary method 400 for targeting and aligning with a landing zone, such as those described above. Unless otherwise specified herein, steps of method 400 may be executed by any suitable computer system. The computer system may be onboard an aircraft or may be off-board the aircraft (e.g., ground-based or cloud-based). The steps below are merely exemplary. The method may include additional steps or may omit one or more of the steps below.

In step 410, a computer system may receive data relating to a radar signal reflected from one or more reflectors (e.g., corner reflectors, such as those in the systems above). The data may be presented to a pilot or other operator of a vehicle. Alternatively, the computer system may not display the data and may act automatically.

In step 420, the computer system may analyze the data to determine whether it is consistent with a predefined target. For example, the computer system may have access to a library of profiles for various landing zones. The library may include any suitable subset of landing zones (e.g., landing zones at a particular airfield, landing zones in a particular geographical area, landing zones available to particular aircraft, landing zones available to a particular operator, or other another subset). Alternatively, the library may include all known landing zones utilizing a reflector system.

The library may include various information regarding landing zones. For example, the library may include a predefined signal (e.g., RCS profile) that is expected to be reflected from a predefined landing zone. The data may be compared to the predefined signal to determine whether it is consistent with the predefined landing zone. Additionally or alternatively, the library may include layout information (e.g., size, number, arrangement) of an array of corner reflectors associated with the predefined landing zone. A computerized system may analyze the data to determine the layout of the reflectors associated with the data. The determined layout may be compared to the library to determine whether it is consistent with the predefined landing zone. Other alternative comparison steps may be used, including a combination of the steps described above.

In performing step 420, the computer system may make use of known features of the corner reflector(s) and/or the corner reflector array. Because corner reflectors reflect signals in known patterns (e.g., because intensity of a reflection decreases at off angles a known rate), the computer system may determine a size of the corner reflector(s) based on the signal received. The computer system may determine a number of corner reflectors, an orientation of the corner reflectors (and the landing zone), a distance from the landing zone, and/or other information. The computer system may receive data indicative of multiple landing zones (i.e., indicative of reflections from reflectors of multiple landing zones) and may differentiate between the multiple landing zones.

In step 430, if the received data is inconsistent with a predefined target, a position of the aircraft may be adjusted (i.e., the aircraft may be repositioned). In one example, a computer system may automatically adjust a position of the aircraft. In another example, the computer system may provide information to an operator (e.g., a pilot) so that the operator can steer the vehicle to a desired location. In this manner, method 400 (and the systems described herein) may assist with moving the vehicle into a desired slot (e.g., at further distances from a landing zone). Following relocation of the vehicle, step 420 may be repeated.

In step 440, if the received data is consistent with a predefined target (e.g., an alignment of the aircraft is validated), then a location of the aircraft relative to the predefined target is determined using the received data. Of note, the data received in step 440 may be the same as or different from the data received in step 410. For example, the received data in step 440 may be obtained at a different (e.g., later) time than the data in step 410. For example, step 410 may be performed when an aircraft is farther from the predefined target, and step 440 may be performed when the aircraft is closer to the predefined target. The types of data gathered in step 410 and step 440 may be the same or different. In step 440, a computer may make use of the fact that reflector intensity decreases at different angles (e.g., at increased angles of incidence between radar boresights and the reflector). Such changes in reflector intensity may facilitate use of as few as one reflector. For example, a computer may scan for a maximum reflection to find a center of the one or more reflector(s). Additionally or alternatively, the computer system may include information regarding the maximum reflection off of the reflector(s) (e.g., in a library). The computer system may compare a received value to the known maximum value, to determine whether the received data is consistent with the maximum value. The maximum reflection value may indicate that a radar boresight is aligned with the reflector.

When going off boresight the reflected radar signal decreases. You could scan for the max reflection to find the center of a single corner reflector.

In step 450, it may be determined whether the location information is consistent with a predefined landing position. For example, it may be determined whether a vehicle (e.g., a VTOL vehicle) is centered on a desired location on the predefined target. Step 450 may include any of the aspects of steps 410 or 420, above, including comparing the received data to a predefined profile (e.g., a profile of a desired landing position). If the location information is consistent with the predefined target, in step 460, the aircraft may be landed (by an operator and/or by automatic computer control). If the aircraft is landed by an operator, a computer system may indicate to the operator that the aircraft is in a predefined landing position (e.g., via a visual indicator or an auditory indicator). On the other hand, if the location information is not consistent with the predefined landing position, then the position of the aircraft may be adjusted (by an operator and/or by automatic computer control) in step 470, and step 440 may be repeated.

Figure 5:
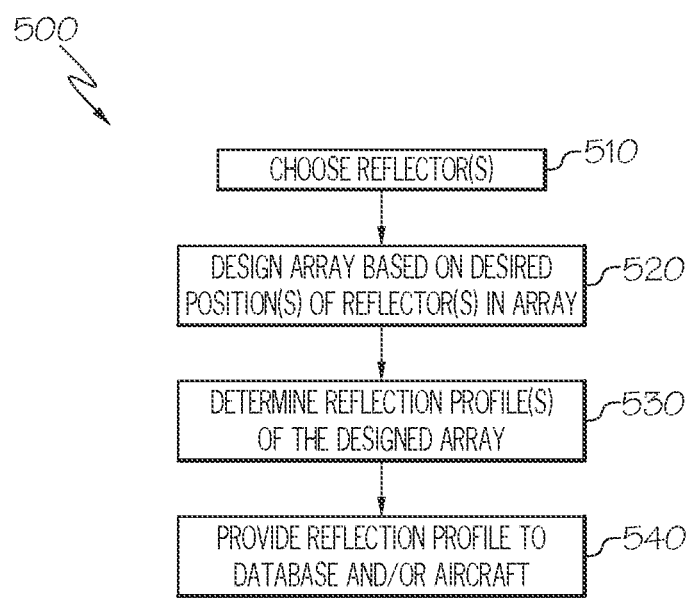

FIG. 5 shows a method 500 for configuring a system, such as the systems described herein. The steps of FIG. 5 may be completed automatically by a computer, manually be a human, or by a combination of both. In step 510, reflectors may be chosen. A type of reflector (e.g., a corner reflector, such as a trihedral corner reflector), a size of a reflector, a color of a reflector, etc. may be considered when choosing a reflector. A plurality of identical reflectors may be chosen, or the reflectors may vary in type, size, color, or other parameters. In step 520, an array may be designed. The array may be based on desired positions of the reflectors in the array. For example, the array may be designed to be differentiated from other, nearby arrays. As discussed above, arrays may have varying shapes and sizes. In step 530, a reflection profile of the desired array may be determined. The array may have multiple reflection profiles, depending on orientation and distance of an aircraft from array, among other factors. The profiles may correspond to a "signature" of an associated landing zone, allowing the landing zone to be identified among a plurality of landing zones. The profile may also convey information about the landing zone (e.g., size, company affiliation, etc.). For example, a particular reflector type may be associated with a particular company. In step 540, the reflection profile may be provided to a database and/or to one or more aircraft (or other vehicles). Thus, the profile may be accessed by automated systems or by pilots in order to complete method 400 (or other methods).

Advantages of the current disclosure include that the systems are easily installed on the ground, without great amounts of complexity, thereby allowing for wide adoption in a cost-effective and low-maintenance way. The systems may be used with a variety of radar systems. Although special software may be required to make use of the disclosed systems and execute the disclosed methods, specialized hardware may not be required. The disclosed systems and methods may fill gaps in existing optical-based systems, especially in low visibility environments. The system could be implemented in a variety of ways. For example, it could be offered as a subscription service. The system could be turned on and off, depending on visual conditions, and could be paid for on an as-used basis. The system may be particularly advantageous as UAM develops and grows.

Figure 6:
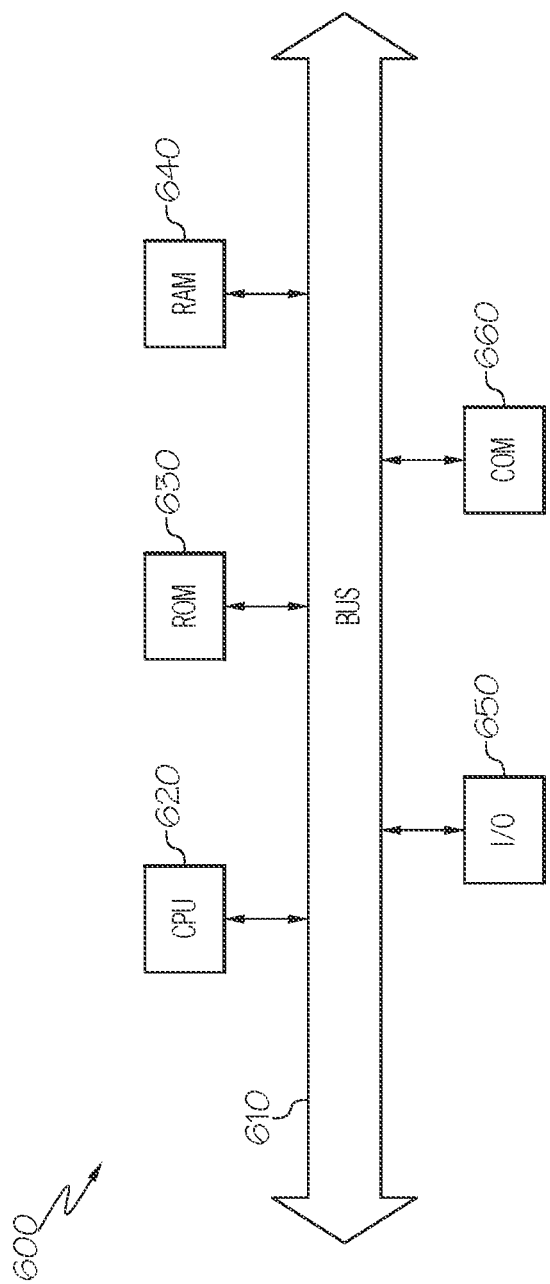
FIG. 6 is an exemplary computer system for use with any of the methods and systems disclosed herein.

FIG. 6 depicts an example system that may execute techniques presented herein. FIG. 6 is a simplified functional block diagram of a computer that may be configured to execute techniques described herein, according to exemplary embodiments of the present disclosure. Specifically, the computer (or "platform" as it may not be a single physical computer infrastructure) may include a data communication interface 660 for packet data communication. The platform may also include a central processing unit ("CPU") 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of navigating a vertical take-off and landing ("VTOL") vehicle near a landing zone, the method comprising:
   receiving data related to a first radar signal reflected from at least one corner reflector;

determining whether the received data is consistent with a predefined target landing zone;

upon determining that the received data is consistent with the predefined target landing zone, determining a location of the VTOL vehicle relative to the predefined target landing zone, using a second radar signal reflected from at least one corner reflector;

determining whether the location of the VTOL vehicle is consistent with a predefined landing position; and upon determining that the location of the VTOL vehicle is inconsistent with the predefined landing position, automatically repositioning the VTOL.

2. The computer-implemented method of claim 1, wherein the first radar signal is reflected from at least three corner reflectors, wherein the corner reflectors are arranged in a triangular array.

3. The computer-implemented method of claim 2, wherein the first radar signal is reflected from exactly three corner reflectors.

4. The computer-implemented method of claim 1, further comprising:

upon determining that the location of the VTOL vehicle is consistent with the predefined landing position, automatically landing the VTOL.

5. The computer-implemented method of claim 1, further comprising:

upon determining that the location of the VTOL vehicle is consistent with the predefined landing position, providing a visual or auditory indicator to an operator of the VTOL vehicle.

6. The computer-implemented method of claim 1, wherein the determining whether the received data is consistent with the predefined target landing zone includes comparing the received data to a library of landing zone profiles.

7. The computer-implemented method of claim 6, wherein the determining whether the received data is consistent with the predefined target landing zone includes determining at least one of a maximum reflection, radar cross-section, a size, or a color of the at least one corner reflector.

8. A computer-implemented method of navigating a VTOL vehicle near a landing zone, the method comprising:

receiving data related to a radar signal reflected from at least three corner reflectors on a predefined target landing zone;

using the received data, determining whether a location of the VTOL vehicle is consistent with a predefined landing position, wherein the determining includes comparing the received data to a predefined profile in a library having a plurality of profiles of a plurality of landing positions; and upon determining that the location of the VTOL vehicle is consistent with the predefined landing position, automatically landing the VTOL vehicle or providing a visual or auditory indicator to an operator of the VTOL vehicle.

9. The computer-implemented method of claim 8, wherein the three corner reflectors define a triangle.

10. The computer-implemented method of claim 8, wherein the determining whether the location of the VTOL vehicle is consistent with the predefined landing position also includes analyzing a visual indicator.

11. The computer-implemented method of claim 8, wherein the predefined profile includes at least one of a shape, size, or color of the at least three corner reflectors.

12. The computer-implemented method of claim 8, wherein the received data is related to the radar signal reflected from exactly three corner reflectors.

13. A system for vehicle landing, the system comprising:

a first corner reflector;

a second corner reflector; and a third corner reflector, wherein the first corner reflector, the second corner reflector, and the third corner reflector are arranged in a triangular shape on a single landing zone for a vertical take-off and landing ("VTOL") vehicle, wherein the first corner reflector has a first radar cross section ("RCS"), wherein the second corner reflector has a second RCS, wherein the first RCS differs from the second RCS, wherein the third corner reflector has a third RCS, and wherein the third RCS differs from the first RCS and the second RCS.

14. The system of claim 13, wherein a center point of the landing zone is within the triangular shape.

15. The system of claim 13, wherein each of the first corner reflector, the second corner reflector, and the third corner reflector has a trihedral shape.

16. The system of claim 13, wherein the triangular shape is at least one of an equilateral shape, an isosceles shape, or a scalene shape.

17. The system of claim 13, wherein the triangular shape is a first triangular shape, and wherein the landing zone is a first landing zone, the system further comprising:

a fourth corner reflector;

a fifth corner reflector; and a sixth corner reflector, wherein the fourth corner reflector, the fifth corner reflector, and the sixth corner reflector are arranged in a second triangular shape on a second landing zone.

18. The system of claim 13, wherein the first corner reflector and the second corner reflector are separated by a first distance, wherein the third corner reflector is separated from a midpoint between the first corner reflector and the second corner reflector by a second distance, wherein the second distance is greater than the first distance.

19. The system of claim 13, wherein the first corner reflector includes a 5 dBsm trihedral corner reflector, a 10 dBsm trihedral corner reflector, or a 15 dBsm trihedral corner reflector.

20. The system of claim 13, wherein the system includes exactly three corner reflectors.

\* \* \* \* \*